A. J. HERSCHMANN.
FLUID RECEPTACLE.
APPLICATION FILED APR. 30, 1920.

1,351,331.

Patented Aug. 31, 1920.

Inventor
ARTHUR J. HERSCHMANN.
by Edwin W. Hammer, Atty

UNITED STATES PATENT OFFICE.

ARTHUR J. HERSCHMANN, OF NEW YORK, N. Y.

FLUID-RECEPTACLE.

1,351,331.  Specification of Letters Patent.  Patented Aug. 31, 1920.

Application filed April 30, 1920. Serial No. 377,996.

*To all whom it may concern:*

Be it known that I, ARTHUR J. HERSCHMANN, a citizen of the United States, and a resident of the city of New York, in the county of New York and State of New York, have invented certain new and useful Improvements in Fluid-Receptacles, of which the following is a specification, reference being had to the accompanying drawings, forming part thereof.

This invention relates to fluid receptacles, and particularly to fluid receptacles designed to receive and hold a separate bottle or other fluid container; the particular embodiment of the invention described herein has to do with a fluid receptacle or jug within which may be placed and securely held a milk or cream bottle of standard shape and size, so as to permit said milk or cream bottle to be moved about and the milk or cream poured therefrom, without such bottle being exposed to view.

It will be understood that such milk bottles are crude and would not present an attractive appearance upon the table, whereas such a bottle, or a succession of such bottles, might readily be placed within the receptacle I provide with ease and convenience and with an approach to a more agreeable appearance.

In previous fluid receptacles designed to receive a standard size of secondary jar, there were practical difficulties of structure and use which rendered them undesirable for the purposes of my invention; they none of them had a nozzle in an otherwise permanently closed top or cover; they had hinged covers which added to their cost, complexity, breakability and unsanitary condition; they were supplied with supplementary interior flanges or diaphragms to prevent spilling or aid drainage, but which formed pockets or recesses in which milk or cream would collect and sour to the disgust of the users; they were designed for the removal of the internal vessel only when the latter was broken or in connection with an unsightly bottom cap instead of an internally applied plug. My invention avoids all of these disadvantageous features and furnishes, for the first time, a simple, cheap, convenient and sanitary device for the purposes stated.

Figure 1:
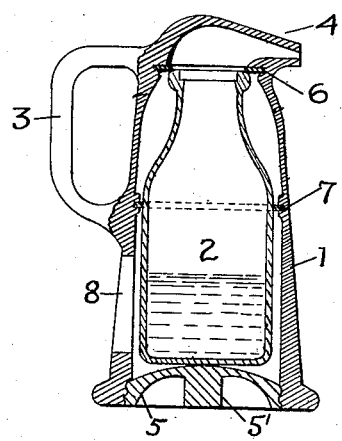
Figure 2:
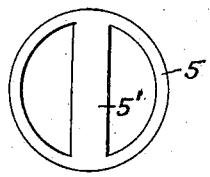
Figure 3:
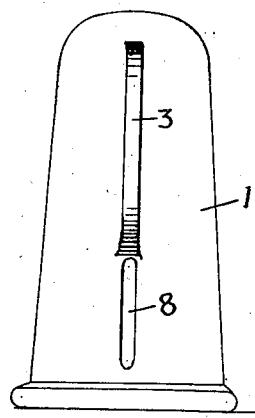

In the accompanying drawings I have shown one embodiment of my invention, Figure 1 showing a side view in section of my fluid receptacle with a milk or cream bottle in place within it;

Fig. 2 is a plan view, viewed from below, of the removable plug fitting the bottom of my fluid receptacle; and Fig. 3 is a rear view of such receptacle.

In these drawings my fluid receptacle is shown as an open-bottomed jug 1 with a permanently covered top integral therewith having a spout, mouth or nozzle 4. This nozzle is the outer end of a fluid conduit which gradually enlarges as it approaches the open end of the bottle with which the inner end registers so as to form a smooth-sided passage for the emission of the fluid without pockets or corners for the possible collection of dirt or sour milk or cream, while permitting the ready cleansing of the jug by pouring hot water through the open bottom. This jug has a handle 3 of convenient form and position, and the open bottom is appropriately threaded, or otherwise formed, for the reception of a coöperating plug 5. As shown, this plug 5 has a transverse bar 5' on its lower face, leaving two openings for the convenient positioning of the fingers in screwing or otherwise applying the plug in place. The milk or cream bottle 2 is of standard size and shape and designed to be received well within the jug or receptacle and held in place by the insertion of the plug 5. For convenience, and to save possible dripping or leakage, I prefer to use a rubber, or other form of, gasket 6, positioned near the top of the jug or receptacle against which the upper end of the bottle may be pressed and make a fluid-tight joint at that point. I also prefer to employ another, or other appropriate form of, washer 7 at some point along the sides of the bottle 2 so as to assist in holding the bottle firmly in position, thereby avoiding rattling or disturbance of the joint at the top of the bottle. I also prefer to provide an opening 8 at some point in the upright side of the jug or receptacle through which opening a view may be had of the interior container so as to determine the approximate amount of milk or other fluid remaining in such container; I have shown this opening 8 as directly beneath the handle of the jug, but do not wish to limit myself to that specific position. When I speak in the claim of a jug with "an otherwise permanently closed upper end" I do not wish to be understood as excluding the possible use of an air-vent hole in such cover to facilitate the pouring out of the fluid from the bottle through the conduit.

What I claim and wish to protect by Letters Patent of the United States is as follows:

A fluid receptacle adapted to receive a readily replaceable and standard size of milk bottle, or the like, from below, comprising an open-bottomed one-piece jug with its otherwise permanently closed upper end provided with a fluid conduit registering at its inner end with the open mouth of the bottle while its outer and smaller end serves as a nozzle for the emission of the fluid, and a removable retaining plug for the bottom of the jug.

ARTHUR J. HERSCHMANN.